US011720615B2

(12) United States Patent
Gutta et al.

(10) Patent No.: US 11,720,615 B2
(45) Date of Patent: Aug. 8, 2023

(54) SELF-EXECUTING PROTOCOL GENERATION FROM NATURAL LANGUAGE TEXT

(71) Applicant: Dsilo, Inc., New York, NY (US)

(72) Inventors: Jaya Prakash Narayana Gutta, New York, NY (US); Sharad Malhautra, New York, NY (US); Lalit Gupta, Bangalore (IN)

(73) Assignee: DSilo Inc., New York, NY (US)

( * ) Notice: Subject to any disclaimer, the term of this patent is extended or adjusted under 35 U.S.C. 154(b) by 0 days.

(21) Appl. No.: 17/877,264

(22) Filed: Jul. 29, 2022

(65) Prior Publication Data

US 2023/0038529 A1 Feb. 9, 2023

Related U.S. Application Data

(60) Provisional application No. 63/227,796, filed on Jul. 30, 2021, provisional application No. 63/227,790, (Continued)

(51) Int. Cl.
*G06F 16/33* (2019.01)
*G06F 40/295* (2020.01)
(Continued)

(52) U.S. Cl.
CPC .......... *G06F 16/3344* (2019.01); *G06F 16/31* (2019.01); *G06F 16/3347* (2019.01);
(Continued)

(58) Field of Classification Search
CPC .. G06F 40/279; G06F 40/186; G06F 16/3344; G06F 16/31; G06F 16/3347;
(Continued)

(56) References Cited

U.S. PATENT DOCUMENTS 10,509,860 B2 12/2019 Zhang
10,861,456 B2 12/2020 Tran et al.
(Continued)

OTHER PUBLICATIONS

"Template;" Free On-Line Dictionary of Computing; Oct. 14, 2007; foldoc.org; pp. 1-2.*
(Continued)

*Primary Examiner* — Andrew R Dyer
(74) *Attorney, Agent, or Firm* — Pillsbury Winthrop Shaw Pittman LLP

(57) ABSTRACT

A process includes obtaining a document, determining a set of vectors based on a count of n-grams of the document, and determining a first set of information based on the document using a first set of neural networks. The process includes selecting a text section of the natural language document using a second set of neural networks and a code template of a plurality of code templates based on the text section based on the first set of information and the text section. The process includes determining an entity identifier, a value of a conditional statement, a second set of information, and a third set of information based on the text section, the first set of information, and the code template. The process includes generating a first set of program code based on the entity identifier, the value, the second set of information, and the third set of information.

21 Claims, 5 Drawing Sheets

Related U.S. Application Data filed on Jul. 30, 2021, provisional application No. 63/227,793, filed on Jul. 30, 2021.

(51) Int. Cl.
  *G06N 20/20* (2019.01)
  *G06F 16/31* (2019.01)
  *G06F 16/35* (2019.01)
  *G06Q 50/18* (2012.01)
  *G06F 40/279* (2020.01)
  *G06F 40/186* (2020.01)

(52) U.S. Cl.
  CPC .......... *G06F 16/355* (2019.01); *G06F 40/186* (2020.01); *G06F 40/279* (2020.01); *G06F 40/295* (2020.01); *G06N 20/20* (2019.01); *G06Q 50/18* (2013.01)

(58) Field of Classification Search
  CPC .... G06F 16/355; G06F 40/295; G06F 40/216; G06F 40/30; G06F 40/35; G06F 40/44; G06Q 20/389; G06Q 50/18; G06N 20/20; G06N 5/04; G06N 3/0442; G06N 3/0455
  USPC ........................................................ 715/256
  See application file for complete search history.

(56) References Cited

U.S. PATENT DOCUMENTS

| | | | |
|---|---|---|---|
| 10,997,503 | B2 | 5/2021 | Dohan et al. |
| 11,113,479 | B2 | 9/2021 | Tran et al. |
| 11,423,068 | B2 | 8/2022 | Faruqui |
| 11,431,660 | B1* | 8/2022 | Leeds ..................... H04L 51/02 |
| 11,520,815 | B1 | 12/2022 | Gutta et al. |
| 11,580,150 | B1 | 2/2023 | Gutta et al. |
| 2006/0074900 | A1 | 4/2006 | Nanavati et al. |
| 2010/0223276 | A1* | 9/2010 | Al-Shameri ........... G06V 20/13 707/769 |
| 2011/0320498 | A1 | 12/2011 | Flor |
| 2014/0067368 | A1 | 3/2014 | Yih |
| 2016/0041980 | A1 | 2/2016 | Mungi |
| 2016/0203152 | A1* | 7/2016 | Burukhin .................. G06F 8/71 707/693 |
| 2016/0358094 | A1 | 12/2016 | Fan |
| 2017/0061250 | A1 | 3/2017 | Gao |
| 2018/0365201 | A1* | 12/2018 | Hunn .................... G06F 40/134 |
| 2019/0012373 | A1 | 1/2019 | Malik |
| 2019/0034404 | A1* | 1/2019 | Anderson ............. G06F 40/186 |
| 2019/0130248 | A1 | 5/2019 | Zhong et al. |
| 2020/0250747 | A1* | 8/2020 | Padmanabhan .......... G06N 5/04 |
| 2020/0293874 | A1 | 9/2020 | Ji et al. |
| 2020/0294133 | A1 | 9/2020 | Cella |
| 2020/0380624 | A1* | 12/2020 | Turgman ................ G06Q 20/02 |
| 2021/0004540 | A1 | 1/2021 | Harper |
| 2021/0004794 | A1* | 1/2021 | Kumar Kumaresan ..................... G06Q 30/0645 |
| 2021/0056150 | A1 | 2/2021 | Karandish et al. |
| 2021/0065304 | A1* | 3/2021 | Greene ................. G06F 40/205 |
| 2021/0109995 | A1 | 4/2021 | Mihindukulasooriya et al. |
| 2021/0294970 | A1 | 9/2021 | Bender et al. |
| 2021/0295822 | A1 | 9/2021 | Tomkins et al. |
| 2021/0312302 | A1* | 10/2021 | Gaur .................. G06Q 30/0601 |
| 2021/0342847 | A1 | 11/2021 | Shachar et al. |
| 2021/0406225 | A1* | 12/2021 | Akhoury ............. G06F 16/1734 |
| 2021/0406772 | A1* | 12/2021 | Shillingford .......... G06F 40/279 |
| 2022/0086131 | A1* | 3/2022 | Kinai .................. G06F 16/2379 |
| 2023/0037077 | A1 | 2/2023 | Gutta et al. |

OTHER PUBLICATIONS

Mik, Eliza; Smart contracts: Terminology, technical limitations and real world complexity; Oct. 2017; Law, Innovation and Technology; pp. 1-26.*

Clack et al.; Smart Contract Templates: foundations, design landscape and research directions; Mar. 15, 2017; Barclays Bank; pp. 1-15.*

"Bayes classifier," Wikipedia, https://en.wikipedia.org/w/index.php?title=Bayes_classifier&oldid=1094620681, Jun. 23, 2022, pp. 1-3.

Montantes, James, "BERT Transformers—How Do They Work?," Becoming Human: Artificial Intelligence Magazine, Apr. 12, 2021, pp. 1-20.

Sharma, Akshay, "Brief Introduction to N-gram and TF-IDF | Tokenization," Feb. 1, 2021, pp. 1-5.

"Deep learning vs. machine learning in Azure Machine Learning," Microsoft Docs, Apr. 2, 2022, https://docks.microsoft.com/en-us/azure/machine-learning/concept-deep-learning-vs-machine-learning, pp. 1-9.

"Extract N-Gram Features from Text component reference," Azure Machine Learning, Apr. 11, 2021, pp. 1-8.

"N-gram," Wikipedia, https://en.wikipedia.org/w/index.php?title=N-gram&oldid=1091994341, Jun. 7, 2022, pp. 1-10.

"N-Grams," DeepAI, https://deepai.org/machine-learning-glossary-and-terms/n-gram, Jul. 29, 2022, pp. 1-3.

"Tf-idf," Wikipedia, https://en.wikipedia.org/w/index.php?title=Tf-id&oldid=1098671947, Jul. 16, 2022, pp. 1-7.

Ibanez, Daniel, "Transformer Text Embeddings," https://www.baeldung.com/cs/transformer-text-embeddings, May 7, 2021, pp. 1-21.

"Vector space model," Wikipedia, https://en.wikipedia.org/w/index.php?title=Vector_space_model&oldid=108409508, Apr. 22, 2022, pp. 1-5.

"Deep Learning," IBM Cloud Education, https://www.ibm.com/cloud/watson-studio/deep-learning, May 1, 2022, pp. 1-9.

Clarke, Matt, "How to use CountVectorizer for n-gram analysis," Practical Data Science, Dec. 24, 2021, pp. 1-15.

Co-Pending U.S. Appl. No. 17/877,321, filed Jul. 29, 2022 by Gutta et al., "Database Generation From Natural Language Text Documents," pp. 1-55.

Co-Pending U.S. Appl. No. 17/877,365, filed Jul. 29, 2022 by Gutta et al., "Database Query Generation Using Natural Language Text," pp. 1-46.

Notice of Allowance in related U.S. Appl. No. 17/877,365 dated Sep. 21, 2022, pp. 1-21.

Corrected Notice of Allowability in related U.S. Appl. No. 17/877,365 dated Oct. 6, 2022, pp. 1-14.

Non-Final Office Action in related U.S. Appl. No. 17/877,321 dated Oct. 13, 2022, pp. 1-24.

Wang et al., Glue: A Multi-Task Benchmark and Analysis Platform for Natural Language Understanding, 2018, pp. 1-20.

Notice of Allowance in related U.S. Appl. No. 17/877,321 dated Dec. 14, 2022, pp. 1-16.

Corrected Notice of Allowability in related U.S. Appl. No. 17/877,321 dated Jan. 5, 2023, pp. 1-12.

Co-Pending U.S. Appl. No. 18/073,815, filed Dec. 2, 2022 by Gutta et al., "Database Query Generation Using Natural Language Text," pp. 1-45.

Co-Pending U.S. Appl. No. 18/108,116, filed Feb. 10, 2023 by Gutta et al., "Database Generation From Natural Language Text Documents," pp. 1-54.

Non-Final Office Action in related U.S. Appl. No. 18/073,815, dated Apr. 25, 2023, pp. 1-11.

* cited by examiner

SELF-EXECUTING PROTOCOL GENERATION FROM NATURAL LANGUAGE TEXT

RELATED APPLICATIONS

This application claims benefit of U.S. Provisional Patent No. 63/227,796 filed Jul. 30, 2021 and titled "SELF-EXECUTING PROTOCOL GENERATION FROM NATURAL LANGUAGE TEXT", U.S. Provisional Patent No. 63/227,793 filed Jul. 30, 2021 and titled "DATABASE GENERATION FROM NATURAL LANGUAGE TEXT DOCUMENTS", and U.S. Provisional Patent No. 63/227,790 filed Jul. 30, 2021 and titled "DATABASE QUERY GENERATION USING NATURAL LANGUAGE TEXT", the entireties of which are each hereby incorporated by reference.

This application is related to U.S. patent application Ser. No. 17/877,321 filed Jul. 29, 2022 and titled "DATABASE GENERATION FROM NATURAL LANGUAGE TEXT DOCUMENTS" (now U.S. Pat. No. 11,580,150), and to co-pending U.S. patent application Ser. No. 17/877,365 filed Jul. 29, 2022, and titled "DATABASE QUERY GENERATION USING NATURAL LANGUAGE TEXT" (now U.S. Pat. No. 11,520,815), the entireties of which are each hereby incorporated by reference.

BACKGROUND

Natural language processing includes techniques usable for deriving meaning and actionable information from natural language documents. Applications often employ natural language processing techniques to perform document processing tasks such as translation or code quantification. Natural language processing often includes training of a model to analyze natural language text and employing the trained model to generate new text based on the natural language document sections.

SUMMARY

The following is a non-exhaustive listing of some aspects of the present techniques. These and other aspects are described in the following disclosure.

Provided in some embodiments are techniques that include methods and systems for discerning information from text documents, and generating associated program code, which may, for example, be deployed on a distributed ledger database of a peer-to-peer network, such as a blockchain. In some embodiments, a document is obtained, a set of vectors is determined based on a count of n-grams of the document, and a first set of numeric values is determined based on the document, using a first set of neural networks. A text section of the natural language document may be selected using a second set of neural networks and a code template of a plurality of code templates may be selected based on the text section and populated based on information, such as numeric values, of the text section. For example, an entity identifier, a value of a conditional statement, a first date, and a second date may be determined based on the text section, a first set of numeric values, and the code template. A first set of program code may be generated based on the information of the text section, such as the entity identifier, the value, the first date, and the second date determined based on the text section.

Provided in some embodiments is a tangible, non-transitory, machine-readable medium storing instructions that are executable by a data processing apparatus to cause a data processing apparatus to perform operations described herein, such as those described above.

Provided in some embodiments is a system, including one or more processors and memory storing instructions that are executable by a data processing apparatus to cause a data processing apparatus to perform operations described here, such as those described above.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
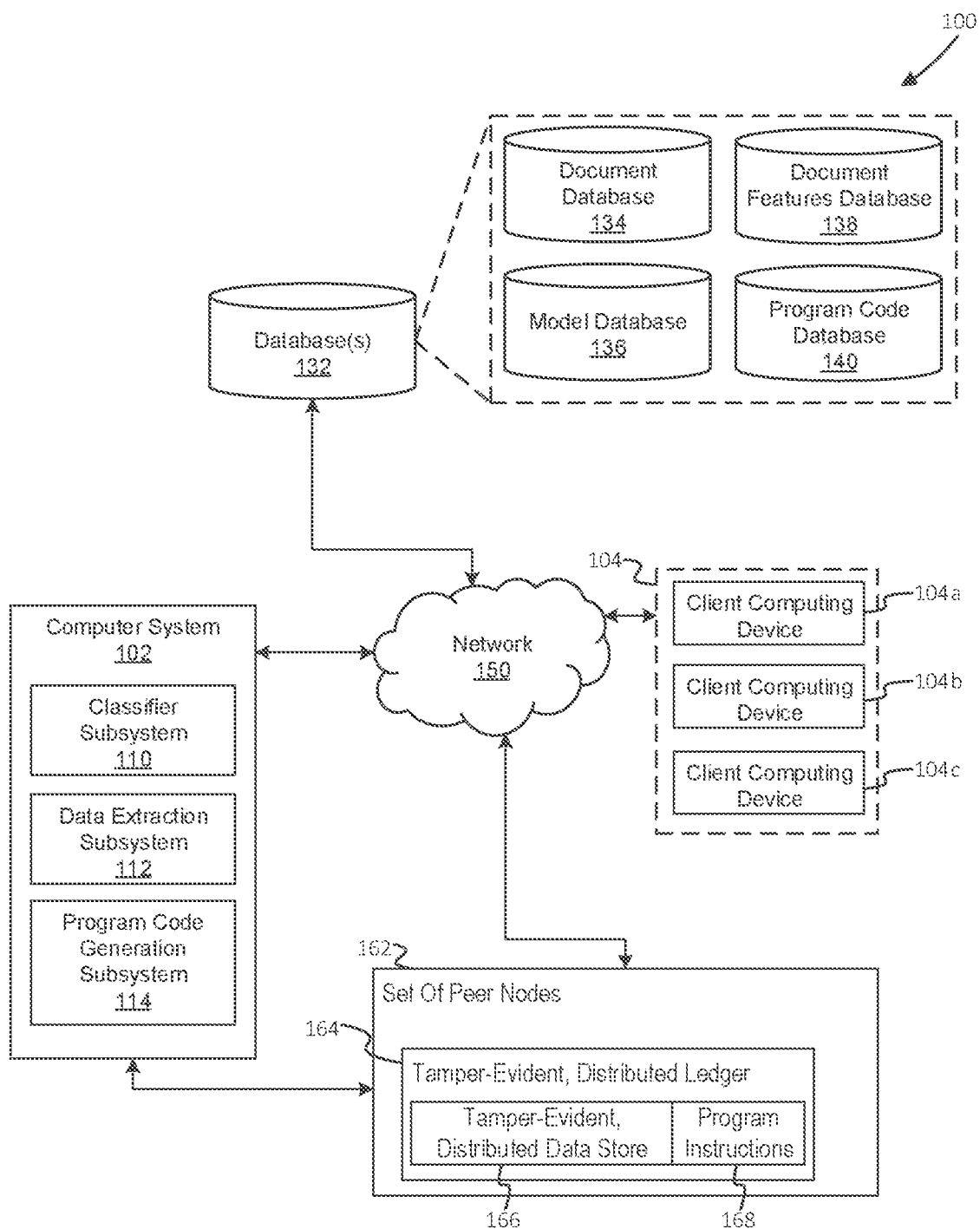
FIG. 1 is a diagram that illustrates a first computing environment in accordance with one or more embodiments of the present technique.

While the present techniques are susceptible to various modifications and alternative forms, specific embodiments are shown by way of example in the drawings and are described in detail. The drawings may not be to scale. The drawings and detailed description thereto are not intended to limit the present techniques to the particular form described, but are intended to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, some embodiments are problem-specific, and not all embodiments address every problem with traditional systems described herein or provide every benefit described herein. That said, improvements that solve various permutations of these problems are described below.

Smart contracts are a form of self-executing protocols that may be hosted over a blockchain platform. Smart contracts provide a clear and trackable way of determining the state of a relationship between two or more entities in a variety of contexts. Such contexts may include determining which nodes in a decentralized computing environment have authority to execute an operation, indicating data-access permission for an entity, determining an amount of a digital asset that may be transferred in exchange for computing resources, or the like. However, existing smart contracts are often be coded in an ad-hoc manner and may be decoupled from any existing natural language text. Such an arrangement may result in a mismatch between what is written on a natural language document representing an agreement between entities and the interactions encoded into a smart contract that controls the agreement between the entities.

Some embodiments may obtain a natural language text document and determine a set of structured sections using a set of deep neural network models. Some embodiments may generate program code, where executing the program code may cause one or more tangible actions with respect to the value modification of one or more entity records. Generating the program code may include indicating an entity, a protocol operation ("action") type associated with the code template, protocol operation descriptions, dates, or other values. Some embodiments may select a code template and populate fields of the template to generate program code to generate program code. Some embodiments may compile the program code into bytecode and deploy the generated bytecode on a blockchain network. Some embodiments may indicate which sections of a natural language text document have been encoded into a self-executing protocol or which sections are not encoded. In addition, some embodiments may validate rules encoded as machine-generated program code by comparing the rules with other rules generated from the corpus.

Some embodiments may obtain a natural language document that is stored in one or more formats and identify clauses or other text sections using a first set of artificial intelligence (AI) learning models (or "learning models"), such as deep learning models or other machine learning models. Some embodiments may then use a second set of learning models (e.g., a second set of deep learning models) to identify one or more entities and protocol operation types based on the identified text sections. Based on the protocol operation types in the content of the text sections themselves, some embodiments may use a hybrid text generation model to generate program code indicating the entity identifier, a program code function of the protocol operation type, or the like. Some embodiments may push the generated program code or a compiled version thereof as a self-executing protocol or update to the self-executing protocol hosted to a block chain network.

By converting some or all of a natural language document or associated unstructured tables into a smart contract, some embodiments may increase the transparency and interpretability of the natural language document. Furthermore, by generating program code directly from a natural language document, errors between document creation and enforcement of the rules written in the document may be reduced. Furthermore, issues stemming from a lack of standardization between different entities may be mitigated by converting document clauses into machine-interpretable program code.

Example Systems

FIG. 1 is a diagram that illustrates a first computing environment in accordance with one or more embodiments of the present technique. FIG. 1 is a diagram that illustrates a first computing environment (or "system") 100 in accordance with one or more embodiments of the present technique. As described, the system 100 may be employed to extract information from a set of documents and use the extracted information to generate program code for a self-executing protocol. In the illustrated embodiment, the system 100 includes a computer system 102 (e.g., including a classifier subsystem 110, a data extraction subsystem 112 and a program code generation subsystem 114), a set of user devices 104 (e.g., including user devices 104a-104c) and databases 132 (e.g., including document databases 134, a model database 136 and a document feature database 138) communicatively coupled by way of a network 150. Although certain embodiments are described herein as being performed by particular components of computer system 102 for the sake of example, some or all of those operations may, in some embodiments, be performed by other components of computer system 102 or other components of system 100. As an example, while one or more operations are described herein as being performed by components of the computer system 102, those operations may, in some embodiments, be performed by components of the set of client computing devices 104. Various instructions, messages, or other sets of values may be communicated between components of the system 100 via a network 150.

In some embodiments, the user devices 104 are mobile or fixed terminals. For example, the user devices 104a-104c may each be a desktop computer, a notebook computer, a tablet computer, a smartphone, a wearable device, or another user device. Users may, for example, utilize one or more user devices 104a-104c to interact with one another, with one or more servers, or with other components of system 100.

In some embodiments, data is obtained from one or more databases 132 for training or use by a set of AI learning models (e.g., deep learning models or other types of machine learning models) to process documents and generate program code based on feature values based on the documents. Machine learning models may be a type of AI learning models, and deep learning models may, for example, be a type of machine model that employs a neural network with multiple layers (which may include one or more hidden layers). Although certain embodiments are described as employing one or more deep learning models for the purpose of illustrations, certain embodiments may employ other suitable types of models, such as other AI and machine learning models. Training operations for a deep learning model may include obtaining corpora from a document database 134 and using the corpora to determine model parameters for the deep learning model. The training may include training a first deep learning model to select a set of document features from a document features database 138, where features of the document features database 138 may be part of a training set associated with training documents of the document database 134. Some embodiments may further train a second deep learning model to generate program code or a compiled version of the program code using a second training set that includes a set of document-extracted data and training program code stored in the program code database 140. After conducting a training operation to determine a set of model parameters, the set of model parameters may then be stored in the model database 136 and retrieved for use in determining document feature values, program code, or performing other operations described herein.

In some embodiments, the classifier subsystem 110 is employed to classify a document and the data extraction subsystem 112 is used to determine feature and values of features contained in a document. For example, the classifier subsystem 110 may use a first set of model parameters from the model database 136 for a first deep learning model to determine relevant features of a document, and the data extraction subsystem 112 may use a second set of model parameters from the model database 136 for a second deep learning model to determine quantitative values associated with the document features. In some embodiments, the program code generation subsystem 114 uses a third set of model parameters from the model database 136 to generate program code based on the quantitative values determined. As described herein, some or all of the respective architectures of the deep learning models may be different from each other. For example, the classifier subsystem 110 may use a Naïve Bayes classifier to assign a first document type (or "category") to a document and select a set of document features associated with the category, the data extraction subsystem 112 may then use the corresponding set of document features in conjunction with the text of the document to determine a set of document feature values using a multi-channel transformer model, such as a dual BERT model or a Siamese BERT model, and The program code generation subsystem 114 may then select a code template (or associated protocol operation type) based on the set of document features or the set of document feature values, and then generate program code based on the code template.

In some embodiments, the network 150 may include a set of peer nodes 162 hosting a tamper-evident, distributed ledger, where the computer system 102 may be a part of, or at least be in communication with, the set of peer nodes 162. In such an embodiment, the set of peer nodes 162 may together employ a distributed ledger peer-to peer-network, such as block-chain network, that maintains a tamper-evident, distributed ledger 164. The computer system 102 may, for example, be separated from the set of peer nodes 162, such that outputs of the computer system 102 may be pushed or otherwise communicated to the set of peer nodes 162. The set of peer nodes 162 may distribute data, orchestrate workloads, or host distributed ledgers such as a tamper-evident, distributed ledger 164. In some embodiments, a tamper-evident, distributed ledger may be used to store program code, database data, or other values for a smart contract that encodes transactions between different entities. In some embodiments, records of protocol operations take based on program code of the smart contract may also recorded on a tamper-evident, distributed ledger hosted by the set of peer nodes 162.

In some embodiments, records having one or more values (e.g., such as those described in this disclosure) are stored on a tamper-evident, distributed ledger 164 hosted by the set of peer nodes 162. Such values may include natural language documents, data extracted from the natural language documents, values determined based on the document-extracted data, program code, or the like. In some embodiments, the tamper-evident, distributed ledger 164 may include or otherwise access a tamper-evident, distributed datastore 166 to store these values. Alternatively, or in addition, some embodiments may perform various operations based on program instructions 168 stored in the tamper-evident, distributed ledger 164. The operations based on the program instructions 168 may include transactions, resource allocations, exchanges, or other interactions between entities, where an entity may include an account record representing an individual, a company, a corporation, a government, a non-profit organization, or another a group of individuals. As described here, the program instructions 168 may be generated by the computer system 102 based on a natural language document, for example, uploaded by the client computing device 104a or obtained from the document features database 138. Executing a transaction, resource allocation, exchange, or other interaction between different entities with a smart contract may include executing (or "calling") a Turing-complete block-chain-based smart contract to execute the exchange or record data to a tamper-evident, distributed datastore 166 used by the smart contract.

For example, some embodiments may generate program code in the Solidity programming language hosted on an Ethereum platform or Cardano platform.

Figure 2:
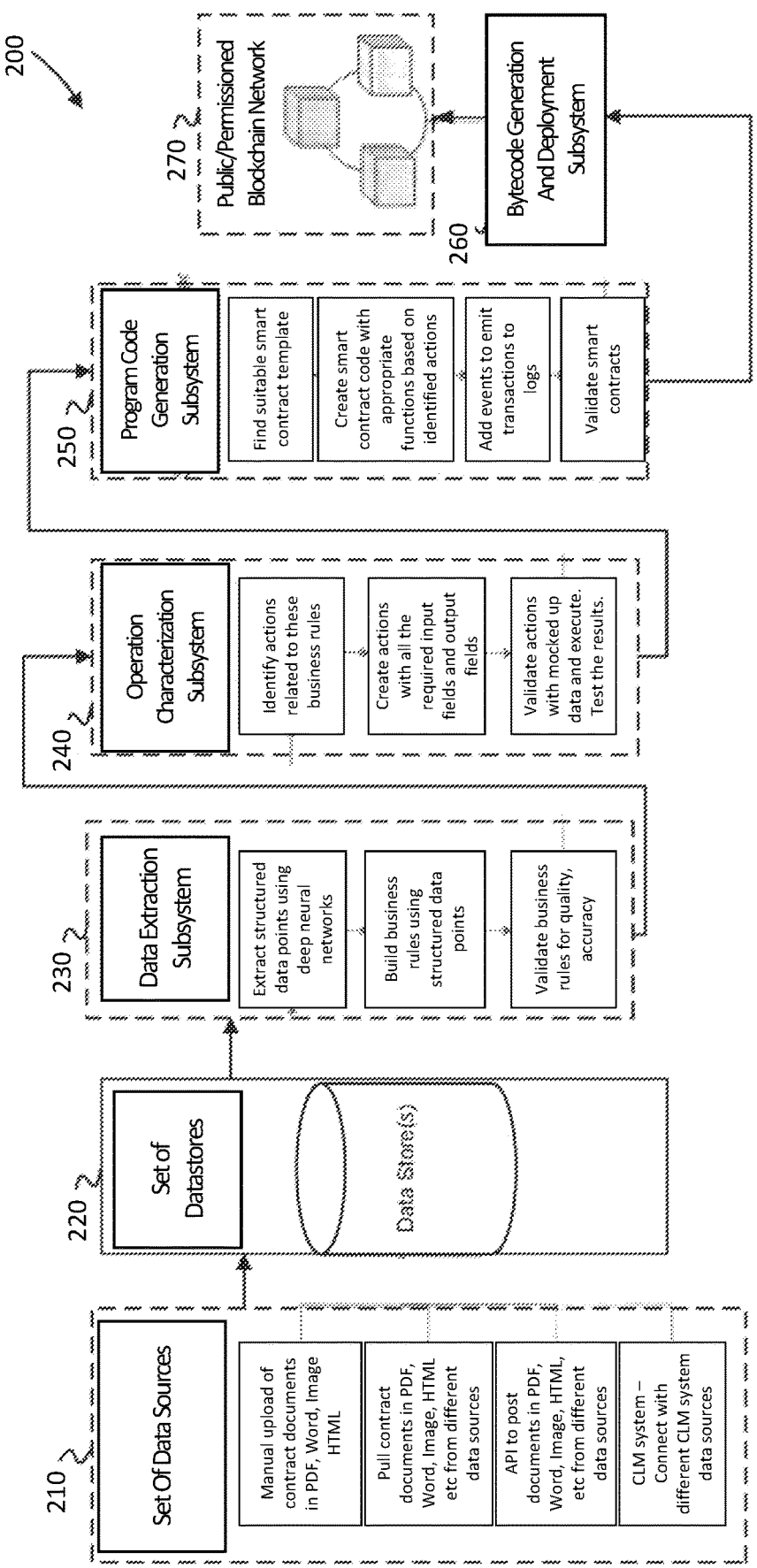
FIG. 2 is a diagram of a logic architecture system in accordance with one or more embodiments of the present technique.

FIG. 2 is a diagram that includes a logic-and-physical-architecture system 200 in accordance with one or more embodiments. The logic-and-physical-architecture system 200 may be employed, for example, to provide a database language query based on an obtained natural language question. In the illustrated embodiment, As indicated by the architecture 200, some embodiments may obtain documents from a set of input data (or "set of data sources") 210. Documents may include, for example, PDF documents, Microsoft Word™ documents, hypertext markup language documents, documents written in other markup languages, plain text documents, or the like. The set of input data 210 may include data obtained from documents uploaded by a user via a client computing device. Alternatively, or in addition, the set of input data 210 may include documents pulled from other document-storing sources such as external servers, government databases, private databases, or the like. Alternatively, or in addition, the set of input data 210 may include data obtained via a set of application program interfaces (APIs), for example, where documents or other data may be obtained via a POST web message. Alternatively, or in addition, documents or other data may be obtained, for example, from a contract lifecycle management (CLM) system.

The documents or other data of the set of input data 210 may be stored in a set of data stores 220. The set of data stores 220 may include, for example, one or more of the databases described herein, such as the document database 134. The input data 210 may, for example, be stored in an original format in which the data was obtained or may be processed to be converted into a different format for storage.

In some embodiments, documents or document-related data stored in the set of data stores 220 is used to extract structured data from a document. For example, a structured form of a document may be generated in association with the document. In some embodiments, one or more operations described herein are performed to determine a set of document-extracted data that may, for example, include document type categories, document features, document feature values, or the like. In some embodiments, the document-extracted data is associated with clauses or another set of text sections used to generate the document-extracted data to determine a structured form of the document and the structured form of the document is stored in the set of data stores 220. Alternatively, or in addition, a structured form of a document may be generated, for example, using formatted document features, such as headers, white spaces, enumerated lists, unenumerated lists, visual markers, font changes, font size changes, or the like.

In some embodiments, the data extraction subsystem 230 extracts structured data using a set of deep learning models, where one or more of the deep learning models includes deep neural networks. For example, the data extraction subsystem 230 may segment portions of a document into a plurality of clauses or other text sections. A set of document features may then be determined based on the text sections using a first deep learning model, such as a bidirectional LS™ model. In some embodiments, a set of document feature values, such as a set of numeric values or other values of primitive data types, is determined based on the document features using a second deep learning model, such as a transformer neural network model.

In some embodiments, the data extraction subsystem 230 extracts additional values based on the document features or document feature values described here. For example, the data extraction subsystem 230 may determine one or more natural language rules of a document written in a text section based on the document features and document feature values. A natural language rule may, for example, be defined by a segment of text within a text section that is identified as a rule. In some embodiments, the rule is validated based on a first set of criteria, where the first set of criteria is obtained from a user-specific account record. For example, a first set of criteria indicating a rule quality or rule accuracy may be retrieved and it may be determined whether the natural language rule satisfies the first set of criteria.

In some embodiments, the document-extracted data is provided to an operation characterization subsystem 240, where the operation characterization subsystem 240 is employed to identify a set of protocol operation characteristics based on the document-extracted data. For example, a first protocol operation characteristic may be determined based on the set of natural language rules, document features associated with the natural language rule, document feature values of the natural language rule, or the like. The operation characterization subsystem 240 may, for example, then generate a set of protocol operation characteristics and output fields. The operation characterization subsystem 240 may then, for example, perform one or more validation operations, such as by determining whether the generated protocol operation characteristics satisfy a second set of criteria.

In some embodiments, the operation characteristics are provided to a program code determination subsystem 250. The program code determination subsystem 250 may, for example, select a code template based on the operation characteristics. In some embodiments, each protocol operation characteristic maps to a corresponding code template. For example, it may be determined that a natural language rule is associated with a first protocol operation characteristic and, in response, a first code template may be selected based on an association between the first code template and the first protocol operation characteristic. In some embodiments, a code template for a natural language rule is selected based on a combination of protocol operation characteristics associated with the rule. For example, a third code template for a rule may be selected based on a determination that the rule is associated with both a first protocol operation characteristic and a second protocol operation characteristic.

In some embodiments, the program code determination subsystem 250 generates a set of program code based on the code template. The code template may include, for example, one or more functions that is mapped to a set of protocol operation characteristics determined, for example, using the operation characterization subsystem 240. Alternatively, or in addition, the code template may include one or more code template fields to be populated by one or more values of the set of data-extracted values obtained from the data extraction subsystem 230 or one or more values determined using the operation characterization subsystem 240. The code template fields may, for example, be populated with entity identifiers representing actors of a protocol operation, a start date, a final date, another type of date for a transaction, a function or class of functions, a programming language object, or the like. In some embodiments, the program code determination subsystem 250 selects or determines an event that causes the mission of a transaction to a log of transactions, where the log of transactions are stored on a tamper-evident, distributed ledger.

In some embodiments, after generating an initial set of program code using the program code determination subsystem 250, the generated program code may be validated using a third set of criteria. One or more criteria of the third set of criteria may be obtained, for example, from a default source. Alternatively, or in addition, one or more criteria of the third set of criteria may be obtained, for example, from a user-specific or a group-specific source, such as a criterion stored in a user account record or a company account record. In some embodiments, the third set of criteria is determined based on other program code. For example, a smart contract may be written in the solidity programming language.

In some embodiments, the program code generated by the program code determination subsystem 250 is provided to a bytecode generation and deployment subsystem 260. The bytecode generation and deployment subsystem 260 may compile or otherwise convert the program code generated by the program code determination subsystem 250 into a bytecode version of the program code. For example, the program code generated by the program code determination subsystem 250 may be written in the Solidity programming language or another type of smart contract programming language. The bytecode generation and deployment subsystem 260 may compile the program code using a script that calls the Solidity command line compiler (e.g., "solc").

Figure 3:
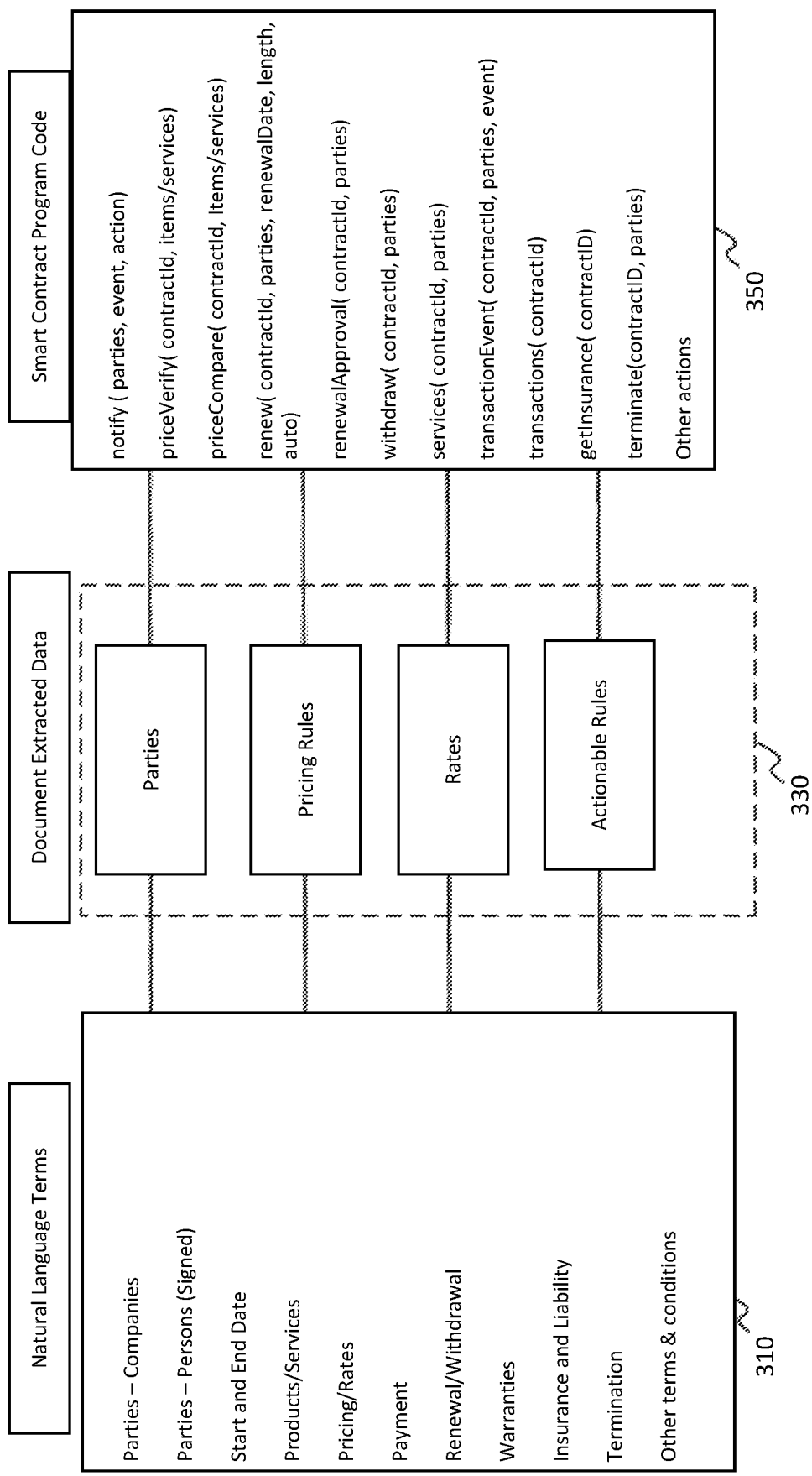
FIG. 3 is a diagram of a map indicating a relationship between data in accordance with one or more embodiments of the present technique.

FIG. 3 is a diagram of a map 300 that indicates a relationship between data in accordance with some embodiments in accordance with one or more embodiments of the present technique. In the illustrated embodiment, the map 300 indicates a relationship between a set of natural language terms 310, an associated set of document-extracted data 330, and an associated set of smart contract program code functions 350. As illustrated, the set of natural language terms 310 may include, for example, terms such as "parties—companies," "parties—persons (signed)," "start and end date," "products/services", "pricing/rates," "payment," "renewal/withdrawal," "warranties," "insurance and liability," "termination," or "other terms and conditions." In some embodiments, one or more natural language terms are mapped to the set of document-extracted data 330. For example, a first deep learning model may be used to select a document feature "parties" based on the document terms "parties—companies" and "parties—persons (signed)" being present in the set of natural language terms 310. In some embodiments, the same first deep learning model, or a different deep learning model, is used to determine a set of entity identifiers based on a document feature (e.g., based on "parties") and one or more clauses (or other text sections). A set of deep learning models may be used, for example, to obtain dates as document feature values from the natural language term "start and end date." Furthermore, as indicated by the map 300, the associated set of document-extracted data 330 may include rates, pricing rules for the rates, or other actionable rules based on the natural language terms.

In some embodiments, a set of program code that includes the set of program code functions 350 is generated. For example, the set of program code functions 350 may use a deep learning model to select the function "notify(parties, event, action)" based on the document-extracted document feature "parties." The values used to populate the function parameters "(parties, event, action)" may be based on entity identifiers, events determined from a set of pricing rules, actions determined from the set of pricing rules, or other data extracted from a natural language document. The set of program code functions 350 may include other functions such as "priceVerify," "priceCompare," "renew," "renewalApproval," "withdraw," "services," "transactionEvent," "transactions," "terminate," or other programming language functions, where a deep learning model may select these functions based on document-extracted data. In some embodiments, one or more function parameters of the set of program code functions 350 are selected based on the document-extracted function. Alternatively, or additionally, a program code template that includes one or more of the functions of the set of program code functions 350 may be selected by default.

Example Program Code Generation and Deployment

In some embodiments, a natural language processing (NLP) computer system, such as system 100, conducts operations for generating and deploying program code based on a natural language document.

In some embodiments, program code generation and deployment operations include obtaining, by a natural language processing (NLP) computer system, an unstructured natural language document including text sections including sequences of textual elements. The textual elements may include, for example, words, phrases, or symbols. In some embodiments, the text sections are structured text sections defined by formatting of textual elements of the text sections (e.g., different fonts, text size, headings, or the like). In such an embodiment, the NLP computer system may identify the text sections based on the formatting of the textual elements of the unstructured natural language document. The text section may be identified, for example, using an algorithm that considers the context of the text in the document, the location of the text in the document, and text properties, such as a text font and size. The combination of context, location and text properties may provide a signal of areas of transition within the document, the signals may be used to identify locations of transitions within the document, and the locations of transitions may be used to define the beginning and ends of text sections within the document.

In some embodiments, the program code generation and deployment operations include document feature information extraction operations to extract sets of features and feature values extracted from different text sections of the unstructured natural language document. In some embodiments, the document feature information extraction operations include determining, by the NLP computer system (e.g., by the document classifier 110), n-grams corresponding to the sequences of textual elements. In some embodiments, each n-gram includes a contiguous sequence of n items from a given sample of textual elements in the document. The n-grams may, for example, include blocks of relatively large textual units, such as words or relatively small textual units, such as syllables. As an example, in a document including the phrase "The contract effective date is 1 Mar. 2022", the phrase may be segmented into the following six 3-grams: "The contract effective", "contract effective date", "effective date is", "date is 1", "is 1 March" and "1 Mar. 2022").

In some embodiments, the document feature information extraction operations include determining, by the NLP computer system (e.g., by the document classifier 110), a count of the n-grams for the document. The count of the n-grams may be, for example, for each of different n-grams, a count of the number of times the n-gram appears in the sequences of textual elements of the document. Continuing with the prior example, if the n-gram "contract effective date" appears nine times in the document, the n-gram "contract effective date" may have a count of "9" for the document.

In some embodiments, the document feature information extraction operations include determining, by the NLP computer system (e.g., by the document classifier 110) and based on the count of n-grams, a vector of the unstructured natural language document. The vector of the unstructured natural language document may, for example, be determined using term frequency-inverse document frequency (TF-IDF) scoring. In a vector representing the unstructured natural language document, each dimension of the vector may correspond to a separate term. The definition of term depends on the application. Terms may be defined, for example, as single words, keywords, or longer phrases. If words are chosen to be the terms, the dimensionality of the vector is the number of words in the vocabulary (the number of distinct words occurring in the corpus). If, for example, a term occurs in the document, its value in the vector is non-zero, and generally increases with the number of occurrences in the document. These vector values, also known as (term) weights, may be determined using, for example, TF-IDF weighting (or "scoring"). A TF-IDF weight (or "score") for a term may be a numerical statistic that is intended to reflect how important a word is to a document in a collection or corpus. A TF-IDF score for a term may, for example, be a product of a term frequency (Tf) of the term within a document and an inverse document frequency (IDF) (e.g., TF-IDF score=Tf*IDF). The term frequency (Tf) of a term may be defined by the relative frequency of the term within document. The inverse document frequency (IDF) may be a measure of how much information the word provides, e.g., if it is common or rare across all documents in a collection or corpus. The inverse document frequency (IDF) may be defined as the logarithmically scaled inverse fraction of the documents that contain the word (obtained by dividing the total number of documents by the number of documents containing the term, and then taking the logarithm of that quotient).

In some embodiments, the document feature information extraction operations include determining, by the NLP computer system (e.g., by the document classifier 110) and based on the vector using a first deep learning model, a category for the unstructured natural language document. The category for the unstructured natural language document may be, for example, a "real estate contract" category determined using the first deep learning model and a vector for the document. In such an embodiment, the first deep learning model may be used to determine that the vector for the document corresponds to the "real estate contract" category. The first deep learning model may be, for example, a Naïve Bayes classifier, a random forest classifier, or a logistic regression classifier.

In some embodiments, the document feature information extraction operations include selecting, by the NLP computer system (e.g., by the data extraction subsystem 112) and from the text sections of the natural language document, a candidate text section of the natural language document. This may include, for example, identifying and selecting a text section that has not yet been encoded into a self-executing protocol. In some embodiments, the document feature information extraction operations include selecting, by the NLP computer system (e.g., by the data extraction subsystem 112) a set of candidate feature information associated with the candidate section selected, the set of candidate feature information including features and feature values of the document feature information extracted from the candidate section.

In some embodiments, the program code generation and deployment operations include selecting, by the NLP computer system (e.g., by the program code generation subsystem 114) from a set of predetermined program code templates (e.g., stored in program code database 140) and based on the set of candidate feature information, a program code template including a set of code template fields that include (a) an entity identifier field and (b) a first parameter value field.

In some embodiments, the program code generation and deployment operations include determining, by the NLP computer system (e.g., by the program code generation subsystem 114) using a second deep learning model (e.g., second set of neural networks, transformer neural network model), code parameters corresponding to the set of code template fields, where the code parameters include (a) a first feature value of the set of candidate feature information corresponding to a value of a parameter, and (b) a second feature value corresponding to an identify of an entity.

In some embodiments, the program code generation and deployment operations include populating, by the NLP computer system (e.g., by the program code generation subsystem 114), the set of code template fields with values of the set of candidate feature information, to generate self-executing program code. The populating of the set of code template fields with values of the set of candidate feature information may include (a) populating the first parameter with the first feature value (e.g., a numerical value), and (b) populating the entity identifier field with the second feature value (e.g., a value corresponding to an identity of the entity), and (b) The self-executing program code may, for example, be executable by a computer processor to perform an operation relating to the entity responsive to occurrence of a condition related to the value of the parameter.

In some embodiments, the program code generation and deployment operations include deploying, by the NLP computer system (e.g., by the program code generation subsystem 114), the program code (e.g., program instructions 168) on a distributed ledger database (e.g., datastore 166 of ledger 166) of a peer-to-peer network (e.g., set of peer nodes 162) ledger 164. The program code may, for example, execute on the peer-to-peer network responsive to occurrence of the condition related to the value of the first parameter.

In some embodiments, the textual elements include words, the unstructured natural language document includes a document outlining contract terms, and the program code defines a contract incorporating the contract terms. The program code may define, for example, a self-executing contract configured to execute responsive to occurrence of the condition related to the value of the first parameter. As a further example, the contract may be a self-executing contract specifying the exchange of monetary funds in response to occurrence of the condition related to the value of the first parameter. The program code deployed on the distributed ledger peer-to peer-network may be executed (e.g., responsive to the occurrence of the condition related to the value of the first parameter) to cause the exchange of the monetary funds in response to the occurrence of the condition related to the populated value of the parameter (e.g., the first feature value). The exchange of monetary funds may be, for example, payment of monetary funds to, or receipt of monetary funds from, the entity. For example, the contract document may outline terms for a real-estate transaction, and the contract may be a real-estate contract that specifies that a financial transaction (e.g., a monetary purchase payment from an escrow account to a selling entity's account) be accomplished in response to the occurrence of a predefined event (e.g., in response to closing of a real estate transaction for the sale a real estate property by the entity), and the computer code stored on the distributed ledger peer-to peer-network may be executed in response to the occurrence of a predefined event to accomplish the financial transaction (e.g., the computer code may monitor for the first parameter changing to a given value representing the closing of the real estate transaction and, upon determining that the first parameter changed to the given value, execute to cause the transfer monies for the purchase payment from the escrow account, into the selling entity's account).

Example Flowchart

The processes presented in this disclosure are intended to be illustrative and non-limiting. In some embodiments, for example, the methods may be accomplished with one or more additional operations not described or without one or more of the operations discussed. Additionally, the order in which the processing operations of the methods are illustrated (and described below) is not intended to be limiting. In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for the execution of one or more of the operations of the methods.

In some embodiments, the system 100 may execute one or more routines described in this disclosure. In some embodiments, the various operations of the process 400 may be executed in a different order, operations may be omitted, operations may be replicated, additional operations may be included, some operations may be performed concurrently, some operations may be performed sequentially, and multiple instances of the process 400 may be executed concurrently, none of which is to suggest that any other description herein is limited to the arrangement described. In some embodiments, the operations of the process 400 may be effectuated by executing program code stored in one or more instances of a machine-readable non-transitory medium, which in some cases may include storing different subsets of the instructions on different physical embodiments of the medium and executing those different subsets with different processors, an arrangement that is consistent with the use of the singular term "medium" herein.

Figure 4:
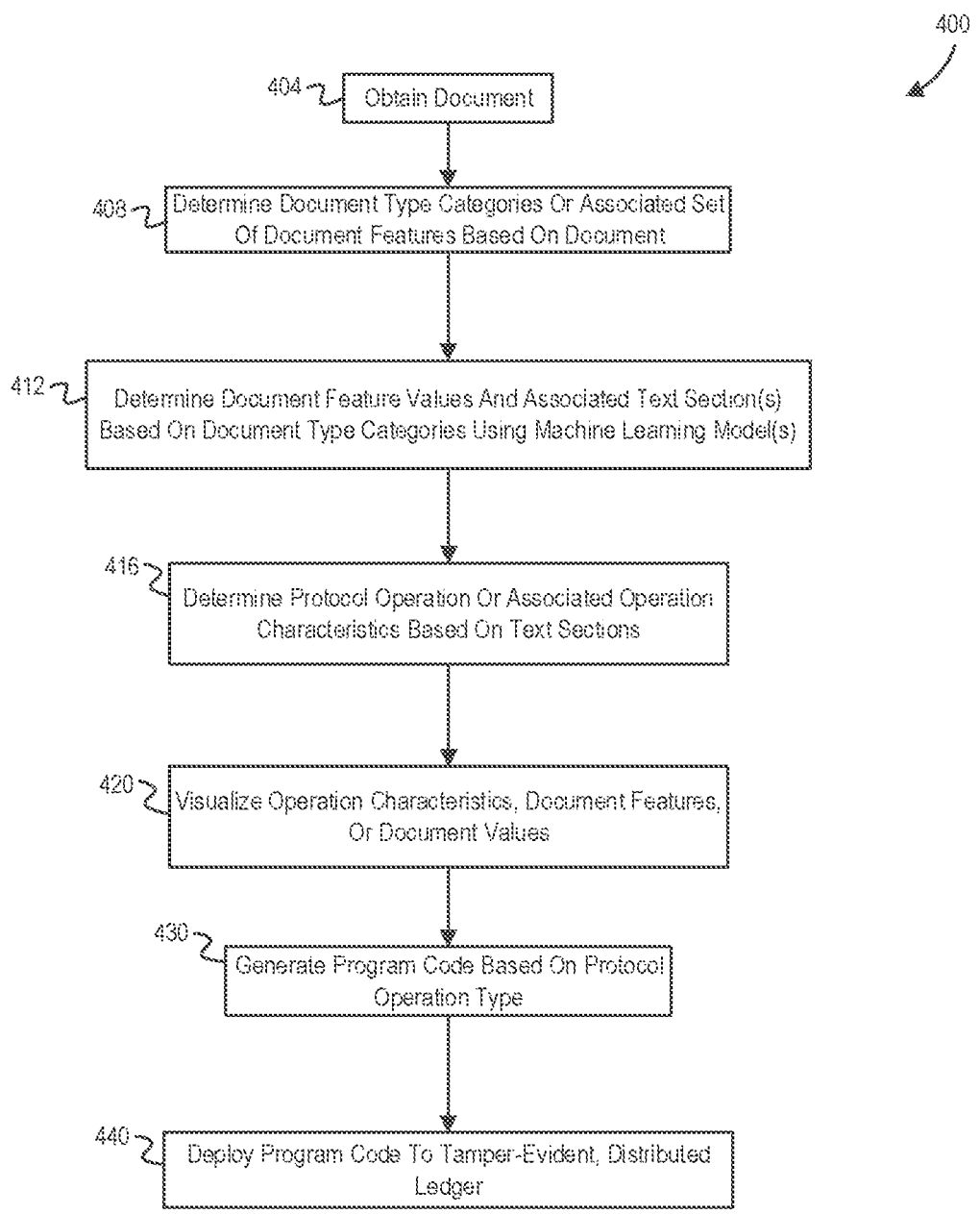
FIG. 4 is a flowchart diagram that illustrates generating program code based on a natural language document in accordance with one or more embodiments of the present technique.

FIG. 4 is a flowchart diagram that illustrates generating program code based on a natural language document in accordance with one or more embodiments of the present technique. In some embodiments, operations of the process 400 may include obtaining a document, as indicated by block 404. Obtaining the document may include obtaining the document from a database or other datastore, a user interface (UI), an API, or the like. For example, some embodiments may obtain the document by pulling a natural language contract document from an online repository. Alternatively, or in addition, some embodiments may obtain a document via a manual upload using a UI element of a webpage or web application, an API, or a CLM system. Once obtained, some embodiments may store the documents or other data in a cloud-based server, a local memory device, or the like.

Some embodiments may obtain and process documents that include one or more visual tables, such as Tables 1 and 2 depicted here. In some embodiments, the content of a visual table is incorporated into a set of program instructions that are capable of applying terms/conditions indicated by the tables. For example, referring to Table 1, which includes rows that specify a discount for an associated item, the content of the table may be incorporated into a set of program instructions that are executable to apply the specified discounts to purchases prices for respective items. For example, if Item 1 is determined to have an un-discounted purchase price of $20, the first set of program instructions may be executable to determine a discounted price of $15 for Item 1. The discounted price may, for example, be provided in a listing of discounted purchase prices for the item or used as a basis for charging a purchaser the discounted amount. As a further example, referring to Table 2, which includes rows that specify increased charges (or "upcharges") for associated events, the content of the table may be incorporated into a set of program instructions that are executable to apply the specified conditions to purchases prices for the items. For example, if Product 1 is determined to have an un-discounted purchase price of $20, the first set of program instructions may be executable to determine whether a purchaser has requested an upgrade of the product, and, if so, apply the 3% upcharge to determine an "upgraded" purchase price of $26. The "upgraded" purchase price may, for example, be provided in a listing of purchase price or used as a basis for charging the purchaser the "upgraded" amount.

TABLE 1

| Product category | Discount |
| --- | --- |
| Item 1 | 25% |
| Item 2 | 25% |
| Item 3 | 25% |
| Item 4 | 22% |
| Item 5 | 22% |
| Item 6 | 25% |
| Item 7 | 20% |

TABLE 2

| Product | Product: Upcharge | Comments |
| --- | --- | --- |
| Product 1 | 3% | Products where customer require upgradations will have a 3% upcharge |
| Product 2 | 6% | Products where customer require early shipment will have a 5% upcharge |

In some embodiments, operations of the process 400 may include determining a set of document type categories or associated set of document features based on the document, as indicated for block 408. Some embodiments may determine a set of operations to characterize a document with values. For example, some embodiments may perform a set of operations on a set of documents including the obtained document, the operations including one-hot encoding, TF-IDF vectorization, or the like. Some embodiments may then provide features obtained from these operations to one or more classifiers (e.g., random forest classifier, logistic regression classifier, naïve Bayes classifier, neural network classifiers) to classify a document with one or more document type categories.

Some embodiments may directly obtain a set of document features based on a document type category using a record associating the set of document features with the document type category. Some embodiments may retrieve a set of rules to determine one or more document features associated with a document. Some embodiments may retrieve the rules, values of the rules, or other information based on the set of document type categories assigned to the document using a document classifier described in this disclosure. Alternatively, or in addition, some embodiments may use a deep learning model, such as a feed-forward neural network or another type of neural network, to directly obtain the set of document features without first determining a document type category.

Some embodiments may then determine a set of document type categories or document features based on a visual table. For example, some embodiments may use a convolutional neural network to classify a visual table, such as tables 1-3 shown above, as a set of pricing rules. Some embodiments may then use the same convolutional neural network or a different deep learning model to determine a set of document features based on columns of the visual table. Alternatively, or in addition, some embodiments may determine a set of document feature values based on the entries for each of the columns for different rows. As disclosed elsewhere in this disclosure, conversion of the table into a set of features and feature values may provide a means of integrating a statement of work into an existing or new master service agreement encoded as a smart contract. Furthermore, specific document features may include features related to tiered pricing, rate cards, service contracts, payment terms, discounts, rebates, or master service agreement templates.

Some embodiments may receive feedback from a user that one or more document features are missing or incorrectly added. Some embodiments may re-train the classifier or another deep-learning model based on user feedback indicating that an accuracy of a set of document feature or document feature values is low. Furthermore, similar training operations may be performed in response to receiving user feedback indicating that a feature value an operation characteristic (described elsewhere in this disclosure) is incorrectly determined, missing, or incorrectly added.

In some embodiments, operations of the process 400 may include determining a set of document feature values and an associated set of text sections based on the document type categories or associated document features using a set of deep learning models, as indicated for block 412. Some embodiments may use a set of deep learning models to obtain the set of document feature values. In some embodiments, a hierarchy of deep learning models may be applied to a document to obtain feature values such as numbers, words representing categories, symbols, hyperlinks, or the like. Some embodiments may first determine a set of clauses or other text sections using a deep learning model, such as a deep recurrent neural network (e.g., a LSTM neural network having four or more neural network layers).

The deep learning model used to determine the set of document feature values may include a multi-channel transformer model, such as a triplet network model or a Siamese BERT model. For example, some embodiments may use a first dual BERT or Siamese BERT model to assign priority scores to sequences of text based on a set of document features. For example, some embodiments may determine a set of vectors representing embedding vectors, where each embedding vector for a word or other n-gram may be determined using a transformer or other set of neural networks. In some embodiments, a neural network used to assign the words of a text section into a set of vectors may obtain one or more neural network parameters (e.g., neuron weights, biases, activation function values, cell memory values, or the like) based on the set of vectors. Furthermore, some embodiments may then provide each sequence that has a priority score that satisfies a priority score threshold to a second deep learning model to determine a document feature value associated with a document feature. The second deep learning model may be another transformer model or may be a different neural network model. In some embodiments, one or more neural network models described in this disclosure may be a deep neural network model, where a deep neural network model includes at least three neural network layers.

After determining the set of document values, some embodiments may then validate the set of document-extracted data using a set of validation criteria. The validation criteria may be based on a determination that a value associated with a document feature is within a numeric range, that a category determined from the text of a text section is one of an allowed set of categories for a document feature, or the like. The validation criteria may include a default criterion or a criterion that is specific to a user or a type of user (e.g., a user associated with a specific organization).

In some embodiments, operations of the process 400 may include determining a protocol operation or associated protocol operation characteristics based on the document values or their associated text, as indicated for block 416. Some embodiments may use a second set of deep learning models to determine the protocol operation based on an analysis of text sections. In some embodiments, a protocol operation may include or otherwise be associated with a set of protocol operation characteristics such as an entity identifier, a protocol operation type, a protocol operation description, a start date, or an end date. The protocol operation may include a smart contract renewal operation, a smart contract expiry operation, or the like.

In some embodiments, a deep learning model of the second set of deep learning models may be the same or different from a deep learning model of the first set of deep learning models. In some embodiments, an operation characteristic may be the same as a document feature value or a document feature. Alternatively, or in addition, an operation characteristic may be different from any of the set of document feature values or set of document features.

Some embodiments may perform one or more validation operations based on the protocol operation characteristics. For example, some embodiments may determine whether a start date is after an end date and issue an alert or prevent workflow completion based on a determination that the start date is after the end date. Additionally, some embodiments may perform a cross-check to determine that a set of indicated locations are correctly assigned.

In some embodiments, operations of the process 400 may include visualizing operation characteristics, document features, or document values, as indicated for block 420. For example, some embodiments may indicate one or more document features or corresponding document feature values on a UI that includes a document. The UI may highlight, circle, or otherwise visually indicate words, names, phrases, or other text of a natural language document based on associations with a document feature or operation characteristic. For example, some embodiments may indicate an entity name, entity address, indicated owner, date, duration, or the like.

In some embodiments, operations of the process 400 may include generating program code based on the set of protocol operation types, as indicated for block 430. Some embodiments may use one or more deep learning models to generate a program code for an indicated protocol operation. Alternatively, or in addition, some embodiments may select a program code template based on the set of protocol operation types. For example, after assigning a first protocol operation type to a rule of a first text section, some embodiments may select a first program code template comprising "if knownFunc1(knownParam1): BLANKF1(BLANKP1)" based on a record associating the first program code template with the protocol operation type. Using a set of deep neural networks, some embodiments may then populate the function "BLANKF1" or the parameter "BLANKP1" with a document feature based on an operation value, entity identifier, or other operation characteristic. Some embodiments may convert a table indicated with a set of categories, such as a table categorized as a pricing rule table, into a set of program instructions. For example, some embodiments may convert Table 1 into a first set of program instructions to indicate different discounts based on different conditions corresponding with rows of Table 1. Similarly, some embodiments may convert Table 2 into a set of "IF" conditional statements or a "CASE" statement indicating a 3% or 6% price change based on different rows of the Table 2.

Some embodiments may generate program code that causes one or more transactions between different entities to be stored using a rollup operation, such as an optimistic rollup operation or a zero-knowledge (ZK) rollup operation. As described elsewhere in this disclosure, some embodiments may generate program code that aggregates transactions between entities of a smart contract hosted on a blockchain network. The aggregated transactions may store some of the transaction data off-chain with respect to the blockchain network. For example, some embodiments may store transactions between entities using ZK rollups. In some embodiments, transactions between entities may be performed off-chain with respect to a hosting blockchain network. Validation of the transactions may be performed by storing account data and balance data of an entity in separate Merkle trees as roots of the trees and then validating a plurality of transactions based on a hashed change in state after performing the plurality of transactions.

In some embodiments, operations of the process 400 may include deploying the program code to a tamper-evident, distributed ledger, as indicated for block 440. In some embodiments, deploying the program code to a tamper-evident, distributed ledger may include deploying a byte-code version of program code to a blockchain network or another type of tamper-evident, distributed ledger. Some embodiments may deploy program code that encodes privacy by explicitly listing organizations that have been allowed or disallowed from obtaining user-related data. Alternatively, or in addition, some embodiments may deploy program code that determines which entities have control over different smart contract parameters. Alternatively, or in addition, some embodiments may deploy program code that encodes rules regarding tiered pricing.

In some embodiments, the tamper-evident, distributed ledger may be hosted on a public blockchain network. Furthermore, some embodiments may encrypt transactions using one or more encryption methods. For example, one or more oracles of a blockchain network may use public key encryption when communicating with data sources. Furthermore, as described elsewhere in this disclosure, embodiments may store data using a rollup operation, such as ZK rollup operation.

Example Computing Device

Figure 5:
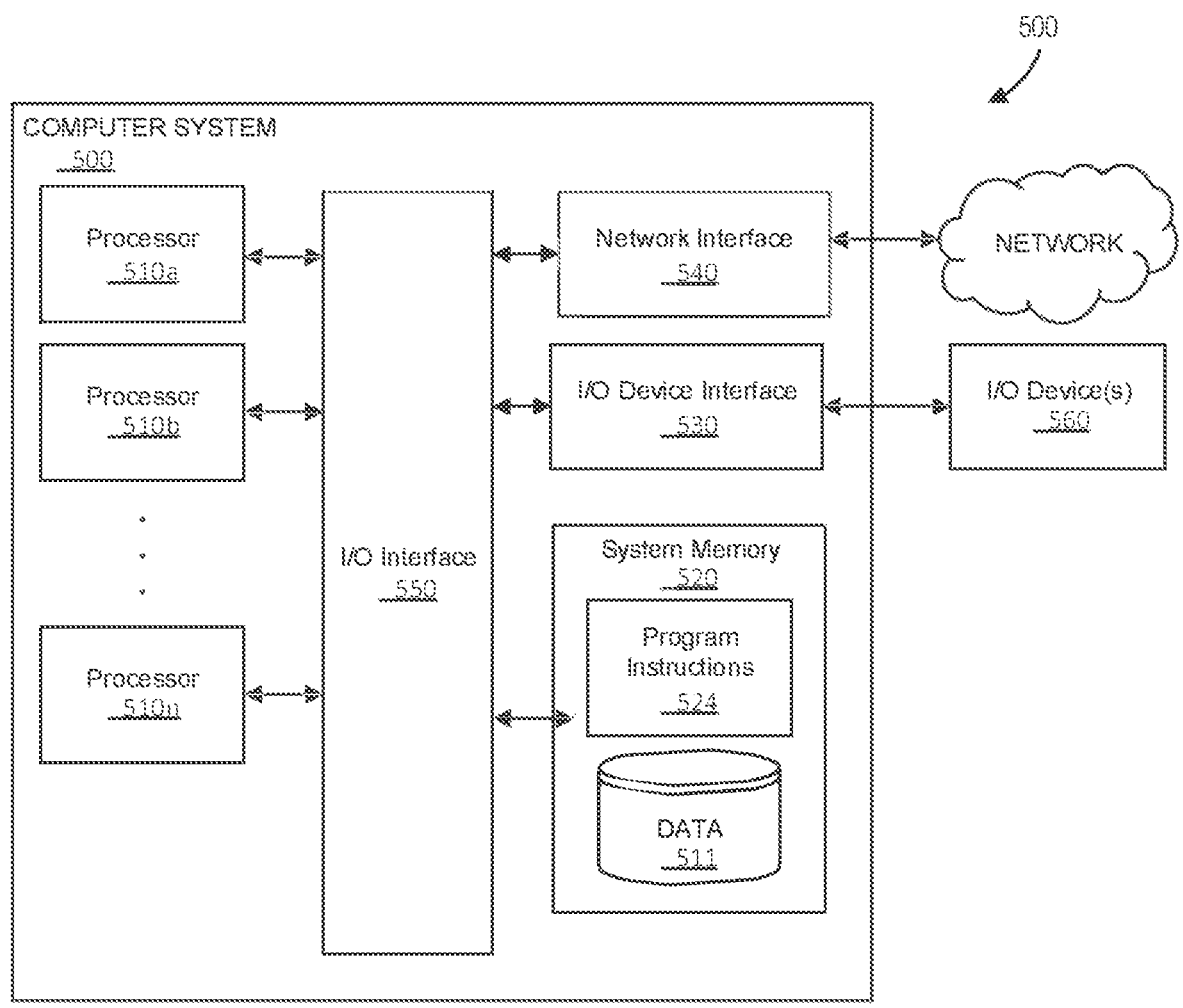
FIG. 5 is a diagram that illustrates an example computing device in accordance with one or more embodiments of the present technique.

FIG. 5 is a diagram that illustrates an example a computing device (or "system") in accordance with one or more embodiments. The present techniques may, for example, be implemented on system 500. Various portions of systems and methods described herein, may include or be executed on one or more computer systems similar to computer system 500. Further, processes and modules described may be executed by one or more processing systems similar to that of computer system 500.

Computer system 500 may include one or more processors (e.g., processors 510a-510n) coupled to System memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 520). Computer system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 524 or data 511. Program instructions 524 may be executable by a processor (e.g., one or more of processors 510a-510n) to implement one or more embodiments of the present techniques. Program instructions 524 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., System memory 520) may include a single memory device and/or a plurality of memory devices (e.g., distributed memory devices). Instructions or other program code to provide the functionality described herein (such as the functions of the system 100) may be stored on a tangible, non-transitory, computer-readable media. The instructions may be executable by a computer processor to cause the associated operations to be performed. In some cases, the entire set of instructions may be stored concurrently on the media, or in some cases, different parts of the instructions may be stored on the same media at different times.

I/O interface 550 may be configured to coordinate I/O traffic between processors 510a-510n, System memory 520, network interface 540, I/O devices 560, and/or other peripheral devices. I/O interface 550 may perform protocol, timing, or other data transformations to convert data signals from one component (e.g., System memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The word "set" when used as a noun include a single item or a plurality of items, such that the phrase "set of items" may refer to either a single item or multiple items. The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Some embodiments may include text navigation indicators or other context values to indicate where one or more document type values is located in a document or verify the validity of an obtained document type value. For example, some embodiments may use a document classifier to determine that a first document has a document type of "Type01A" and a corresponding document feature of "effective date." The value for the document feature "effective date" may be stored in a first text section having the header "date listing." Some embodiments may perform one or more operations described in this disclosure on the first text section to retrieve a corresponding document feature value for the document feature "effective date" from the first text section using a Siamese BERT model. As described elsewhere in this disclosure, the relative sparsity of contract data may make dual input learning models such as the Siamese BERT model useful.

Some embodiments may apply a hierarchical set of deep learning models to obtain document feature values or other values of a document based on their corresponding types of values. For example, after using a first deep learning model to obtain a first set of document feature values, some embodiments may use a second deep learning model to obtain a second set of document feature values. The first set of document feature values may be a set of quantities, and the second set of document feature values may be a set of strings. Furthermore, some embodiments may obtain a set of pre-trained deep learning models using transfer learning techniques, where the set of pre-trained deep learning models may be further updated based on new feedback indicating whether one or more predicted values is correct.

As described elsewhere in this disclosure, some embodiments may use learning model parameters that are cached on a local computing device to perform one or more data extraction operations. For example, some embodiments may push a set of learning model parameters to a user computing device and then, after receiving a request to perform a data extraction operation, some embodiments may instruct the user computing device to extract data from a document based on the set of learning model parameters. Alternatively, or in addition, some embodiments may use learning model parameters that are stored in a fast cache, where the speed of data access with respect to the cash may be greater relative to a speed of data access for a persistent storage used to store documents. For example, some embodiments may obtain model parameters from a Redis datastore.

In some embodiments, operations of the process 400 may include determining whether a set of criteria is satisfied based on the set of document type values, as indicated for block 420. In some embodiments, one or more rules may be used to verify or otherwise validate field values obtained from a document. For example, some embodiments may apply a first set of rules associated with a first document type to a set of obtained field values, where the first set of rules. Some embodiments may apply a plurality of rules based on a document type category. For example, based on a determination that a document has a document type category of "transaction contract," some embodiments may apply a set of rules to check whether a corresponding set of obtained document feature values includes values that populate a first field titled "supplier," a second field titled "payment," or other fields of a corresponding set of document features. Various other rules may be applied, such as a rule that a set of compliance checks are satisfied, a set of conditions indicating non-suspicious activity is satisfied.

In some embodiments, different sets of criteria may be applied. For example, a first set of criteria may include a set of criteria indicating data quality, where criteria may include determining whether a first set of fields titled "required" has been populated with an associated set of field values or whether a set of derived field values have been determined. The set of criteria may also include determining whether the set of field values is cross-validated with other data, whether a set of ranges associated with one or more fields satisfy a corresponding range threshold, whether the source of the document being analyzed is listed as an accepted data source, or the like. A second set of rules may include a set of compliance rules corresponding with an account record or a group of account records identifying or otherwise associated with an organization. For example, the second set of rules may determine whether the field values indicate duplicate payment or invoices, duplicate purchase numbers for a same item, or the like. In some embodiments the set of rules being applied to a document may be specific to a document type, where a determination may be made about whether a document is actually of the document type (e.g., a document is identified by a set of headers or vocabulary as a contract), whether a document identifier is correct, whether a set of document feature values is present or within a range of known acceptable values, or the like. For example, some embodiments may determine whether a document has features associated with a document type "contract," whether the document has a correct identifier, whether the document lists either no discount or an incorrect discount value, or the like. Some embodiments may further determine reconciliation rules, where the reconciliation rules may include determining mismatches in quantity, price, or other numeric values.

Certain embodiments include a method of generating program code based on a natural language document, that includes: obtaining a natural language document; determining a set of vectors based on a count of n-grams of the natural language document; determining a first set of information based on the natural language document using a first set of neural networks; selecting a text section of the natural language document using a second set of neural networks based on the set of vectors; selecting a program code template of a plurality of program code templates based on the text section of the natural language document; determining an entity identifier, a value of a conditional statement, a second set of information, and a third set of information based on the text section, the first set of information, and the code template; and generating a first set of program code based on the entity identifier, the value, the second set of information, and the third set of information.

What is claimed is:

1. A method of deploying program code based on a natural language document, the method comprising:

obtaining, by a natural language processing (NLP) computer system, an unstructured natural language document;

extracting, by the NLP computer system, sets of features and feature values from text sections of the unstructured natural language document;

segmenting, by the NLP computer system using a first deep learning model, the unstructured natural language document into a set of text sections;

determining, by the NLP computer system from the set of text sections, a set of one or more text sections as having not yet been encoded into self-executing program code;

selecting, by the NLP computer system in response to determining the set of one or more text sections as having not yet been encoded into self-executing program code, a text section of the set of one or more text sections as a candidate text section of the unstructured natural language document;

determining, by the NLP computer system, a set of candidate feature information associated with the candidate section, the set of candidate feature information comprising features and feature values of the sets of features and feature values extracted from the candidate section;

selecting, by the NLP computer system from a set of predetermined program code templates and based on the set of candidate feature information, a program code template, the program code template comprising a set of code template fields, the set of code template fields comprising:
  a first parameter value field; and
  an entity identifier field; and determining, by the NLP computer system using a second deep learning model, code parameters corresponding to the set of code template fields, the code parameters comprising:
  a first feature value corresponding to the first parameter value field; and
  a second feature value of the set of candidate feature information corresponding to an identity of an entity;

generating, by the NLP computer system, self-executing program code, the generating of the self-executing program code comprising populating the set of code template fields with values of the set of candidate feature information, the populating of the set of code template fields with values of the set of candidate feature information comprising:
  populating the first parameter value field with the first feature value; and populating the entity identifier field with the second feature value,
wherein the self-executing program code is configured to execute an operation relating to the entity responsive to occurrence of a condition related to the populated value of the first parameter value field;
deploying, by the NLP computer system, the program code on a distributed ledger database of a peer-to-peer network,
determining that the condition related to the populated value of the first parameter value field occurs; and
executing, in response to determining that the condition related to the populated value of the first parameter value field occurs, the self-executing program code deployed on the distributed ledger database to cause the operation relating to the entity in response to the occurrence of the condition related to the populated value of the first parameter value field.

2. The method of claim 1, wherein the text sections comprise structured text sections of the natural language document defined by formatting of textual elements of the text sections, and
wherein the method further comprises determining, by the NLP computer system, the text sections based on the formatting of the textual elements of the unstructured natural language document.

3. The method of claim 1, wherein the text sections comprise sequences of textual elements, and wherein extracting sets of features and feature values from text sections of the unstructured natural language document comprises:
determining, by the NLP computer system, n-grams corresponding to the sequences of textual elements;
determining, by the NLP computer system, a count of the n-grams, the count of the n-grams comprising, for each of different n-grams, a count of the number of times the n-gram appears in the sequences of textual elements;
determining, by the NLP computer system and based on the count of n-grams, vectors of the unstructured natural language document;
determining, by the NLP computer system based on the vectors of the unstructured natural language document, document feature information comprising the sets of features and feature values extracted from text sections of the unstructured natural language document.

4. The method of claim 1, wherein the unstructured natural language document comprises a document outlining contract terms, and wherein the program code defines a contract incorporating the contract terms.

5. The method of claim 1, wherein the program code defines a self-executing contract that executes responsive to the occurrence of the condition related to the populated value of the first parameter value field.

6. The method of claim 5, wherein the contract comprises a self-executing contract specifying the exchange of monetary funds in response to the occurrence of the condition related to the populated value of the first parameter value field, and wherein execution of the program code deployed on the distributed ledger peer-to peer-network causes the exchange of the monetary funds in response to the occurrence of the condition related to the populated value of the first parameter value field.

7. The method of claim 6, wherein the exchange of monetary funds comprises payment of monetary funds to or receipt of monetary funds from the entity.

8. A system for deploying program code based on a natural language document, the system comprising:
a computer processor; and
non-transitory computer-readable storage medium comprising program instructions stored thereon that are executable by the computer processor to cause the following operations:
obtaining, by a natural language processing (NLP) computer system, an unstructured natural language document;
extracting, by the NLP computer system, sets of features and feature values from text sections of the unstructured natural language document;
segmenting, by the NLP computer system using a first deep learning model, the unstructured natural language document into a set of text sections;
determining, by the NLP computer system from the set of text sections, a set of one or more text sections as having not yet been encoded into self-executing program code;
selecting, by the NLP computer system in response to determining the set of one or more text sections as having not yet been encoded into self-executing program code, a text section of the set of one or more text sections as a candidate text section of the unstructured natural language document;
determining, by the NLP computer system, a set of candidate feature information associated with the candidate section, the set of candidate feature information comprising features and feature values of the sets of features and feature values extracted from the candidate section;
selecting, by the NLP computer system from a set of predetermined program code templates and based on the set of candidate feature information, a program code template, the program code template comprising a set of code template fields, the set of code template fields comprising:
a first parameter value field; and
an entity identifier field; and
determining, by the NLP computer system using a second deep learning model, code parameters corresponding to the set of code template fields, the code parameters comprising:
a first feature value corresponding to the first parameter value field; and
a second feature value of the set of candidate feature information corresponding to an identity of an entity;
generating, by the NLP computer system, self-executing program code, the generating of the self-executing program code comprising populating the set of code template fields with values of the set of candidate feature information, the populating of the set of code template fields with values of the set of candidate feature information comprising:
populating the first parameter value field with the first feature value; and
populating the entity identifier field with the second feature value,
wherein the self-executing program code is configured to execute an operation relating to the entity responsive to occurrence of a condition related to the populated value of the first parameter value field; and
deploying, by the NLP computer system, the program code on a distributed ledger database of a peer-to-peer network for execution responsive to occurrence of the condition related to the populated value of the first parameter value field.

9. The system of claim 8, wherein the text sections comprise structured text sections of the natural language document defined by formatting of textual elements of the text sections, and
  wherein the method further comprises determining, by the NLP computer system, the text sections based on the formatting of the textual elements of the unstructured natural language document.

10. The system of claim 8, wherein the text sections comprise sequences of textual elements, and wherein extracting sets of features and feature values from text sections of the unstructured natural language document comprises:
  determining, by the NLP computer system, n-grams corresponding to the sequences of textual elements;
  determining, by the NLP computer system, a count of the n-grams, the count of the n-grams comprising, for each of different n-grams, a count of the number of times the n-gram appears in the sequences of textual elements;
  determining, by the NLP computer system and based on the count of n-grams, vectors of the unstructured natural language document;
  determining, by the NLP computer system based on the vectors of the unstructured natural language document, document feature information comprising the sets of features and feature values extracted from text sections of the unstructured natural language document.

11. The system of claim 8, wherein the unstructured natural language document comprises a document outlining contract terms, and wherein the program code defines a contract incorporating the contract terms.

12. The system of claim 8, wherein the program code defines a self-executing contract configured to execute responsive to occurrence of the condition related to the populated value of the first parameter value field.

13. The system of claim 12, wherein the program code defines a self-executing contract specifying the exchange of monetary funds in response to occurrence of the condition related to the populated value of the first parameter value field, and wherein the execution of the program code deployed on the distributed ledger peer-to peer-network causes the exchange of the monetary funds in response to the occurrence of the condition related to the populated value of the first parameter value field.

14. The system of claim 13, wherein the exchange of monetary funds comprises payment of monetary funds to the entity or receipt of monetary funds from the entity.

15. A non-transitory computer-readable storage medium comprising program instructions stored thereon that are executable by a computer processor to cause the following operations for deploying program code based on a natural language document:
  obtaining, by a natural language processing (NLP) computer system, an unstructured natural language document;
  extracting, by the NLP computer system, sets of features and feature values from text sections of the unstructured natural language document;
  segmenting, by the NLP computer system using a first deep learning model, the unstructured natural language document into text sections;
  determining, by the NLP computer system from the set of text sections, a set of one or more text sections as having not yet been encoded into self-executing program code;
  selecting, by the NLP computer system in response to determining the set of one or more text sections as having not yet been encoded into self-executing program code, a text section of the set of one or more text sections as a candidate text section of the unstructured natural language document;
  determining, by the NLP computer system, a set of candidate feature information associated with the candidate section, the set of candidate feature information comprising features and feature values of the sets of features and feature values extracted from the candidate section;
  selecting, by the NLP computer system from a set of predetermined program code templates and based on the set of candidate feature information, a program code template, the program code template comprising a set of code template fields, the set of code template fields comprising:
    a first parameter value field; and
    an entity identifier field;
  determining, by the NLP computer system using a second deep learning model, code parameters corresponding to the set of code template fields, the code parameters comprising:
    a first feature value corresponding to the parameter value field; and
    a second feature value of the set of candidate feature information corresponding to an identity of an entity;
  generating, by the NLP computer system, self-executing program code, the generating of the self-executing program code comprising populating the set of code template fields with values of the set of candidate feature information, the populating of the set of code template fields with values of the set of candidate feature information comprising:
    populating the first parameter value field with the first feature value; and
    populating the entity identifier field with the second feature value,
  wherein the self-executing program code is configured to execute an operation relating to the entity responsive to occurrence of a condition related to the populated value of the first parameter value field; and
  deploying, by the NLP computer system, the program code on a distributed ledger database of a peer-to-peer network for execution responsive to occurrence of the condition related to the populated value of the first parameter value field.

16. The medium of claim 15, wherein the text sections comprise structured text sections of the natural language document defined by formatting of textual elements of the text sections, and
  wherein the method further comprises determining, by the NLP computer system, the text sections based on the formatting of the textual elements of the unstructured natural language document.

17. The medium of claim 15, wherein the text sections comprise sequences of textual elements, and wherein extracting sets of features and feature values from text sections of the unstructured natural language document comprises:
  determining, by the NLP computer system, n-grams corresponding to the sequences of textual elements;
  determining, by the NLP computer system, a count of the n-grams, the count of the n-grams comprising, for each of different n-grams, a count of the number of times the n-gram appears in the sequences of textual elements;

determining, by the NLP computer system and based on the count of n-grams, vectors of the unstructured natural language document;

determining, by the NLP computer system based on the vectors of the unstructured natural language document, document feature information comprising the sets of features and feature values extracted from text sections of the unstructured natural language document.

18. The medium of claim 15, wherein the unstructured natural language document comprises a document outlining contract terms, and wherein the program code defines a contract incorporating the contract terms.

19. The medium of claim 15, wherein the program code defines a self-executing contract configured to execute responsive to occurrence of the condition related to the populated value of the first parameter value field.

20. The medium of claim 19, wherein the program code defines a self-executing contract specifying the exchange of monetary funds in response to occurrence of the condition related to the populated value of the first parameter value field, and wherein the execution of the program code deployed on the distributed ledger peer-to peer-network causes the exchange of the monetary funds in response to the occurrence of the condition related to the populated value of the first parameter value field.

21. The medium of claim 20, wherein the exchange of monetary funds comprises payment of monetary funds to the entity or receipt of monetary funds from the entity.

* * * * *